(12) United States Patent
Tokarev Sela et al.

(10) Patent No.: US 12,430,335 B2
(45) Date of Patent: Sep. 30, 2025

(54) SYSTEM AND METHOD FOR IMPROVED CACHE UTILIZATION USING AN ORGANIZATIONAL MEMORY TO GENERATE A DASHBOARD

(71) Applicant: Sisense Ltd., Ramat Gan (IL)

(72) Inventors: Inna Tokarev Sela, Tel Aviv (IL); Yael Lev, Tel Aviv (IL); Guy Boyangu, Tel Aviv (IL); Yuval Shoklar, Tel Aviv (IL)

(73) Assignee: Sisense Ltd., Ramat Gan (IL)

( * ) Notice: Subject to any disclaimer, the term of this patent is extended or adjusted under 35 U.S.C. 154(b) by 0 days.

(21) Appl. No.: 17/015,908

(22) Filed: Sep. 9, 2020

(65) Prior Publication Data

US 2020/0409955 A1    Dec. 31, 2020

Related U.S. Application Data

(63) Continuation-in-part of application No. 16/876,943, filed on May 18, 2020, now Pat. No. 11,663,498, and a continuation-in-part of application No. 16/731,668, filed on Dec. 31, 2019.

(60) Provisional application No. 63/020,620, filed on May 6, 2020, provisional application No. 62/898,236, filed on Sep. 10, 2019, provisional application No. 62/850,760, filed on May 21, 2019.

(51) Int. Cl.
| | |
|---|---|
| *G06F 16/2455* | (2019.01) |
| *G06F 16/2453* | (2019.01) |
| *G06F 16/2457* | (2019.01) |
| *G06F 16/26* | (2019.01) |
| *G06N 5/02* | (2023.01) |

(52) U.S. Cl.
CPC .. *G06F 16/24552* (2019.01); *G06F 16/24542* (2019.01); *G06F 16/24578* (2019.01); *G06F 16/26* (2019.01); *G06N 5/02* (2013.01)

(58) Field of Classification Search
CPC ......... G06F 16/24552; G06F 16/24542; G06F 16/24578; G06F 16/26; G06N 5/02; G06N 5/022
See application file for complete search history.

(56) References Cited

U.S. PATENT DOCUMENTS

| | | | |
|---|---|---|---|
| 6,519,592 B1* | 2/2003 | Getchius | G06Q 30/00 707/999.005 |
| 8,412,727 B1 | 4/2013 | Das et al. | |
| 9,305,092 B1 | 4/2016 | Finkelstein et al. | |
| 9,558,265 B1* | 1/2017 | Tacchi | G06F 16/338 |

(Continued)

*Primary Examiner* — Hung T Vy
(74) *Attorney, Agent, or Firm* — M&B IP Analysts, LLC

(57) ABSTRACT

A system and method for improving cache efficiency. A method includes selecting at least one cacheable query node of a plurality of query nodes from a semantic knowledge graph, wherein the semantic knowledge graph includes the plurality of query nodes and a plurality of edges, each edge connecting two of the plurality of query nodes and having a connecting score, wherein the connecting score of each edge indicates a strength of relationship between the two nodes connected by the edge; storing a result of executing a query generated based on the at least one cacheable query node in a cache; and generating a query execution plan based on the at least one cacheable query node, wherein the generated query execution plan includes at least one instruction for query execution using the stored result.

21 Claims, 11 Drawing Sheets

(56) References Cited

U.S. PATENT DOCUMENTS

| | | |
|---|---|---|
| 9,836,183 B1* | 12/2017 | Love .................... G06F 16/904 |
| 10,216,860 B2 | 2/2019 | Miranker et al. |
| 10,452,458 B2 | 10/2019 | Seto |
| 10,997,244 B2 | 5/2021 | Russell et al. |
| 11,768,869 B2 | 9/2023 | Lipka et al. |
| 2003/0033288 A1 | 2/2003 | Shanahan et al. |
| 2008/0140643 A1 | 6/2008 | Ismalon |
| 2008/0240570 A1 | 10/2008 | Shi et al. |
| 2010/0281029 A1 | 11/2010 | Parikh et al. |
| 2013/0218898 A1 | 8/2013 | Raghavan et al. |
| 2013/0226562 A1 | 8/2013 | Arnon |
| 2014/0280114 A1 | 9/2014 | Keysar et al. |
| 2014/0280307 A1 | 9/2014 | Gupta et al. |
| 2014/0330804 A1 | 11/2014 | Bao et al. |
| 2014/0344265 A1 | 11/2014 | Boucher et al. |
| 2014/0372931 A1 | 12/2014 | Zhai et al. |
| 2015/0169758 A1 | 6/2015 | Assom et al. |
| 2015/0370787 A1 | 12/2015 | Akbacak et al. |
| 2015/0379414 A1 | 12/2015 | Yeh et al. |
| 2016/0239758 A1 | 8/2016 | Jeong et al. |
| 2016/0267166 A1 | 9/2016 | Kohlmeier et al. |
| 2016/0314348 A1 | 10/2016 | Wang et al. |
| 2016/0373456 A1* | 12/2016 | Vermeulen .......... G06F 16/3322 |
| 2017/0068903 A1 | 3/2017 | Hakkani-Tur et al. |
| 2017/0076206 A1 | 3/2017 | Lastras-Montano et al. |
| 2017/0329844 A1* | 11/2017 | Tacchi ................ G06F 16/9024 |
| 2017/0330094 A1 | 11/2017 | Lindsley |
| 2017/0344711 A1 | 11/2017 | Liu et al. |
| 2018/0082183 A1 | 3/2018 | Hertz et al. |
| 2018/0129959 A1 | 5/2018 | Gustafson et al. |
| 2018/0137424 A1 | 5/2018 | Royval et al. |
| 2018/0150750 A1 | 5/2018 | Verdejo et al. |
| 2018/0203924 A1 | 7/2018 | Agrawal et al. |
| 2018/0210913 A1* | 7/2018 | Beller ................ G06F 16/9024 |
| 2018/0218011 A1 | 8/2018 | Taycher et al. |
| 2018/0218066 A1 | 8/2018 | Krishnan et al. |
| 2018/0357238 A1 | 12/2018 | Cowan et al. |
| 2019/0057310 A1 | 2/2019 | Olmstead et al. |
| 2019/0087755 A1 | 3/2019 | Hull et al. |
| 2019/0095530 A1 | 3/2019 | Booker et al. |
| 2019/0129961 A1 | 5/2019 | Maiti et al. |
| 2019/0146970 A1* | 5/2019 | Chamieh .......... G06F 16/24524 707/718 |
| 2019/0155961 A1 | 5/2019 | Alonso et al. |
| 2019/0278777 A1 | 9/2019 | Malik et al. |
| 2019/0294732 A1 | 9/2019 | Srinivasan et al. |
| 2019/0324780 A1 | 10/2019 | Zhu et al. |
| 2020/0097560 A1* | 3/2020 | Kulkarni ............ G06Q 30/0201 |
| 2020/0117658 A1* | 4/2020 | Venkata ................ G06F 16/248 |
| 2020/0134492 A1 | 4/2020 | Copeland |
| 2020/0250235 A1 | 8/2020 | Abhyankar et al. |
| 2020/0301953 A1 | 9/2020 | Abhyankar et al. |
| 2020/0364619 A1 | 11/2020 | Kazemi et al. |
| 2020/0372026 A1 | 11/2020 | Hyde et al. |
| 2020/0372373 A1 | 11/2020 | Sela et al. |
| 2020/0409955 A1 | 12/2020 | Sela et al. |
| 2021/0064609 A1 | 3/2021 | Riscutia et al. |
| 2021/0166141 A1 | 6/2021 | Taguchi et al. |
| 2021/0350125 A1 | 11/2021 | Arvela et al. |
| 2022/0075948 A1 | 3/2022 | Yuan et al. |

* cited by examiner

SYSTEM AND METHOD FOR IMPROVED CACHE UTILIZATION USING AN ORGANIZATIONAL MEMORY TO GENERATE A DASHBOARD

CROSS-REFERENCE TO RELATED APPLICATIONS

This application claims the benefit of U.S. Provisional Application No. 63/020,620 filed on May 6, 2020.

This application is also a continuation-in-part (CIP) of U.S. patent application Ser. No. 16/876,943 filed on May 18, 2020, now pending, which claims the benefit of U.S. Provisional Application No. 62/850,760 filed on May 21, 2019.

This application is also a CIP of U.S. patent application Ser. No. 16/731,668 filed on Dec. 31, 2019, now pending, which claims the benefit of U.S. Provisional Application No. 62/898,236 filed on Sep. 10, 2019. The Ser. No. 16/731,668 Application also claims the benefit of U.S. Provisional Application No. 62/850,760 filed on May 21, 2019.

All of the applications referenced above are herein incorporated by reference.

TECHNICAL FIELD

The present disclosure relates generally to business intelligence systems, and more particularly to improving computing efficiency of queries completed by business intelligence systems.

BACKGROUND

Business Intelligence is a field of endeavor which, among other things, attempts to give raw data (e.g., collected measurements) meaning and context which a human user can use to gain insights. Improving the ability to provide insights, store data, and give context, are all therefore advantageous in this field.

Improving user experience (UX) with Business Intelligence (BI) dashboards increases the value such tools provide to end users. One such way to improve UX is by decreasing response times to user requests. Loading dashboards faster, and responding to changes in views of displayed widgets are two examples of desirable effects that can improve UX.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improving cache efficiency. The method comprises: selecting at least one cacheable query node of a plurality of query nodes from a semantic knowledge graph, wherein the semantic knowledge graph includes the plurality of query nodes and a plurality of edges, each edge connecting two of the plurality of query nodes and having a connecting score, wherein the connecting score of each edge indicates a strength of relationship between the two nodes connected by the edge; storing a result of executing a query generated based on the at least one cacheable query node in a cache; and generating a query execution plan based on the at least one cacheable query node, wherein the generated query execution plan includes at least one instruction for query execution using the stored result.

Certain embodiments disclosed herein also include a non-transitory computer readable medium having stored thereon causing a processing circuitry to execute a process, the process comprising: selecting at least one cacheable query node of a plurality of query nodes from a semantic knowledge graph, wherein the semantic knowledge graph includes the plurality of query nodes and a plurality of edges, each edge connecting two of the plurality of query nodes and having a connecting score, wherein the connecting score of each edge indicates a strength of relationship between the two nodes connected by the edge; storing a result of executing a query generated based on the at least one cacheable query node in a cache; and generating a query execution plan based on the at least one cacheable query node, wherein the generated query execution plan includes at least one instruction for query execution using the stored result.

Certain embodiments disclosed herein also include a system for improving cache efficiency. The system comprises: a processing circuitry; and a memory, the memory containing instructions that, when executed by the processing circuitry, configure the system to: select at least one cacheable query node of a plurality of query nodes from a semantic knowledge graph, wherein the semantic knowledge graph includes the plurality of query nodes and a plurality of edges, each edge connecting two of the plurality of query nodes and having a connecting score, wherein the connecting score of each edge indicates a strength of relationship between the two nodes connected by the edge; store a result of executing a query generated based on the at least one cacheable query node in a cache; and generate a query execution plan based on the at least one cacheable query node, wherein the generated query execution plan includes at least one instruction for query execution using the stored result.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
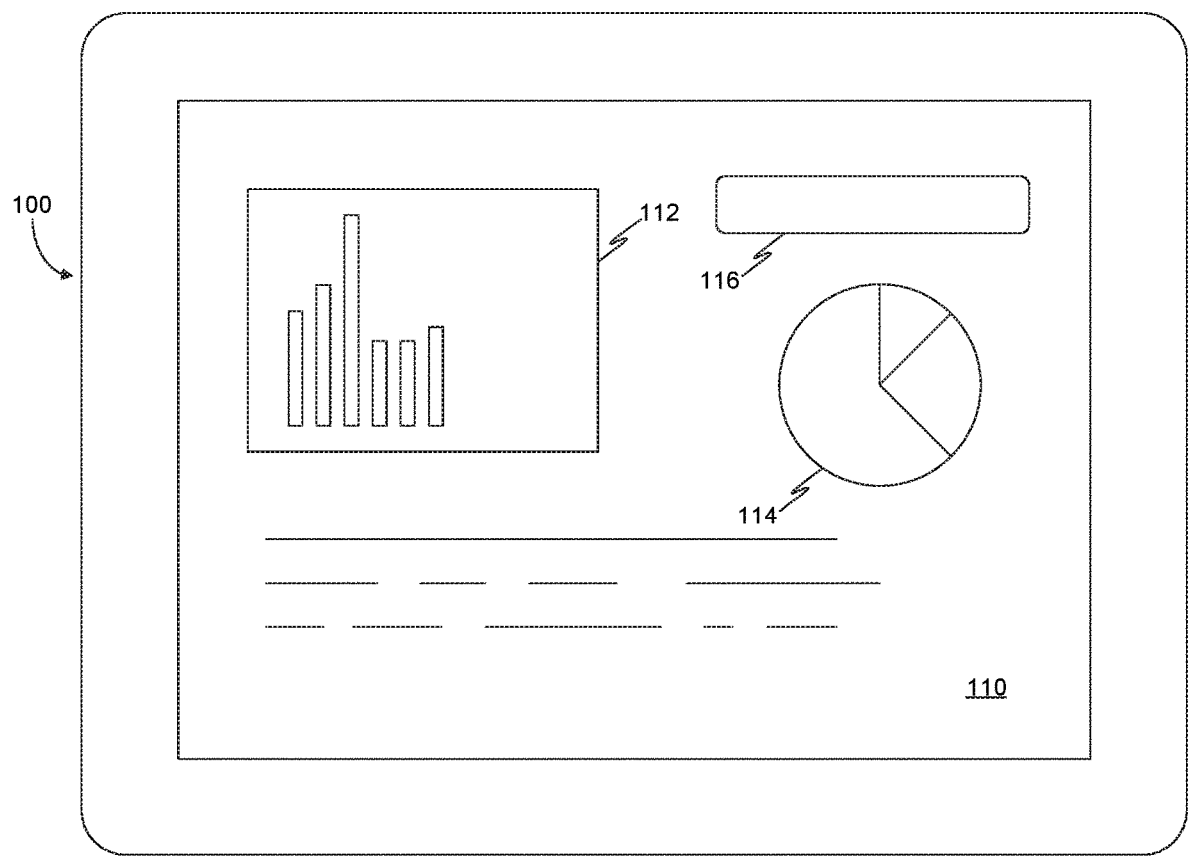
FIG. 1 is an illustration of a user device displaying a business intelligence (BI) system dashboard.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that, by prefetching query results used to populate dashboard widgets before a user requests them, perceived responsiveness may increase. This improves user experience. A semantic knowledge graph may be used both to determine order of query execution and continuously predict, after a dashboard has loaded, what the next query (or queries) will be. These predictions may be utilized to prepopulate the results prior to user requests.

The disclosed embodiments provide techniques for improving cache efficiency that can be utilized in business intelligence systems to speed up queries. The disclosed embodiments allow for decreasing load times for graphical user interfaces used to show results of queries, thereby providing an improved user experience. The disclosed embodiments utilize properties of semantic knowledge graphs in order to predict upcoming user queries, thereby allowing for caching potential query results prior to a user query. As a result, the average time for responding to user queries is decreased.

FIG. 1 is an example schematic illustration of a user device 100 displaying a business intelligence (BI) system dashboard 110. The dashboard 110 may be part of a user interface (not shown) which is designed to convey data and insights based on the data to a user of the device (not shown) on which the UI is executed. The device may be a suitable computing device having at least a display and an input device such as a keyboard, mouse, touchscreen, and the like.

The dashboard 110 includes one or more widgets. A widget is a graphical rendering generated based on data which may be received by executing a query on a relational database (or another data source) and generating the graphical representation based on the resulting data received as a result of executing the query. In the example implementation shown in FIG. 1, the dashboard includes a bar graph widget 112, a pie graph widget 114, and a query textual input interface 116.

A user interacting with the user interface may request, for example, to update the data represented in one or more of the widgets or to present data based on a different temporal view (e.g., a different range of time). In accordance with the disclosed embodiments, a user may input a query to be executed on one or more data sources through the user interface. The result of executing the query is returned for display on the dashboard 110.

Figure 2:
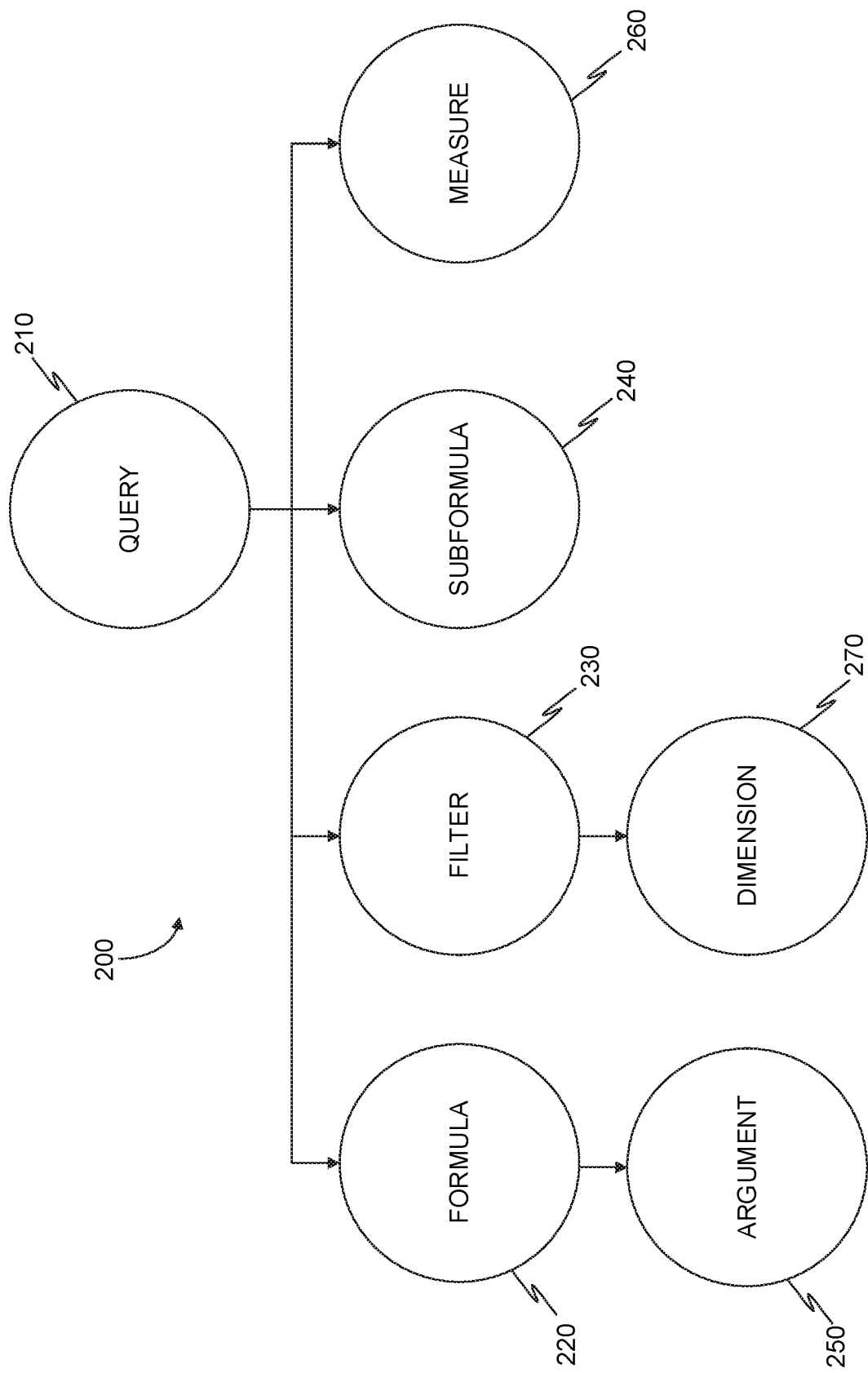
FIG. 2 is an illustration of a query structure.

FIG. 2 is an example illustration of a query structure 200. In the example implementation shown in FIG. 2, the query structure 200 includes a query 210, one or more formulae 220, a filter 230, one or more sub-formulae 240, an argument 250, a measure 260, and a dimension 270.

Each formula 220 may be a higher degree of one of the sub-formulae 240. The query graph structure 200 may be used to represent any query in a graph structure including nodes and connections. The connections may be relations between the nodes represented as edges in the graph structure. Throughout this disclosure, the terms "relations," "relationships," "edges," and "links" interchangeable when used with respect to nodes and vertices. The formulae 220, measure 260, or dimension 270 may be used for filtering by filter 230. It is readily understood that a formula may have a filter in a sub-formula thereof.

Figure 3:
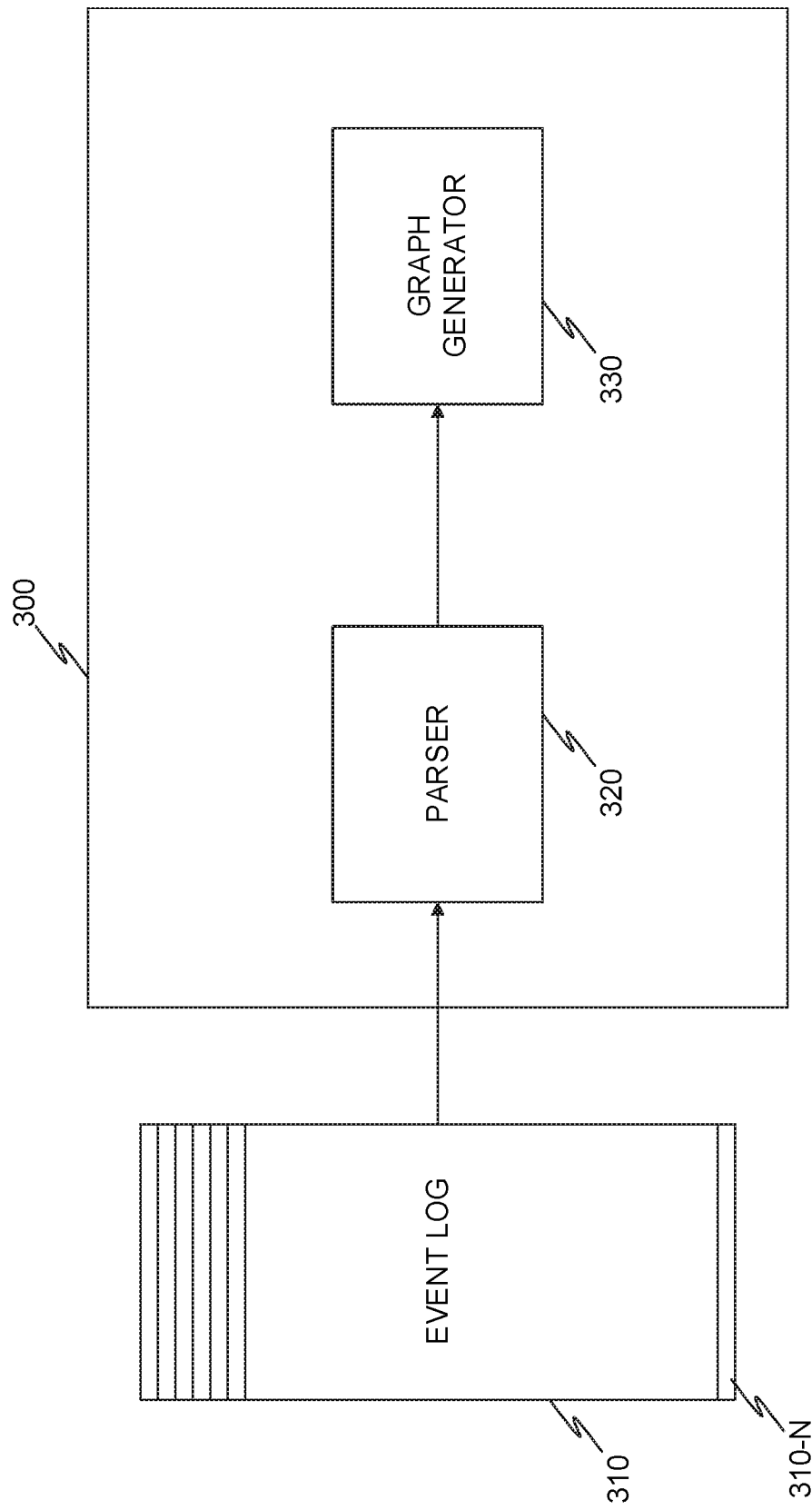
FIG. 3 is a flow diagram illustrating a system for generating a semantic knowledge graph according to an embodiment.

FIG. 3 is a flow diagram illustrating a semantic model generator 300 for generating a semantic knowledge graph according to an embodiment. The semantic model generator 300 is configured to receive one or more event logs 310. An event log 310 includes a plurality of events such as event 310-N (where 'N' is an integer having a value of '2' or greater). Each event is generated in response to instructions executed with respect to a dashboard (e.g., the dashboard 110 of FIG. 1).

In certain embodiments, the event log 310 may record events which are generated in response to executing instructions on a data source such as, for example, executing a structured query language (SQL) query on a database. As a non-limiting example, a dashboard user interface may request to execute a JAQL (JSON query language) expression with respect to a BigData data source. The JAQL expression is then stored in the event log 310.

The event log 310 may also store events such as, but not limited to, a request to change a temporal view of a widget, a request to filter data in a widget, a request to perform an active or passive instruction, and the like. A passive instruction is performed automatically. For example, when loading a dashboard, certain queries are to be executed in order to at least initially populate the widget with data results. Active instructions may be queries requested by a user, filtered views request by the user, and the like.

The event log 310 is fed into a parser 320. The parser 320 is configured to receive one or more events of the event log 310 and to parse the events into a data format for the graph generator 330. The parser 320 may be further configured to detect objects within an event. An object may be, but is not limited to, a formula, filter, argument, element, or sub-formula, for example as shown in FIG. 2 above. The parser 320 may be further configured to determine a relationship between one or more objects based on the event.

In some implementations, the relationship between objects may be defined with respect to a hierarchy. Further, the hierarchy may be directional (i.e., top-to-bottom or vice-versa) such that relationships may be further defined with respect to the direction from one node to another in a hierarchy. As a non-limiting example, a node representing "Alice" may be higher in a hierarchy than a node representing "Bob" such that the relationship between "Alice" and "Bob" is "parent-child". A hierarchy may also be determined based on metadata of the data sources.

It is important to note that the semantic knowledge graph may be generated without access to the data itself by accessing the event log, metadata of the data source(s), or a combination thereof. This may be useful if a graph is being generated either by or for a third party which is not privy to the underlying data.

The graph generator 330 is configured to generate semantic knowledge graphs based on the parsed event logs. For example, the graph generator 330 may be configured to detect a first object having a relationship to a second object. The graph generator 330 may further be configured to assign a weight to the relationship. In this example, the first object may appear once with a "SUM" relationship to the second object, and eleven instances with an "AVG" relationship to the second object. Therefore the "AVG" relationship would carry a higher weight.

In an embodiment, the graph generator 330 is configured to generate a semantic knowledge graph based on all possible relationships between all detected objects. The graph generator 330 is configured to assign weights to each relationship based on the relations extracted and parsed from the event log 310. In some embodiments, one or more relations of the semantic knowledge graph can be based on interactions of one or more users with the semantic model generator 300. For example, an event log may indicate a user which performed or requested to perform certain operations. Two objects may have a relationship having a first weight from the perspective of a first user, and a second weight from the perspective of a second user.

In another embodiment, a semantic knowledge graph may be generated with respect to a user based at least partially on events which the user (e.g., via a user account or user device) initiated. In certain embodiments, a semantic knowledge graph may be generated based on the event logs of multiple users such as, but not limited to, users who belong to a certain organization or group within an organization. The weights attached to the relations in the semantic knowledge graph may be default set weights. The default weights can be then adjusted for each existing or new user by the semantic model generator 300 based on events generated by the user. This allows for retention of some organizational memory as well as for customization of a user's experience of a user accessing a BI system. In some embodiments, the graph generator 330 may be further configured to generate a graph for a user account based on permissions of the user. For example, a certain user may be unauthorized to view data associated with certain objects, in which case the graph generator 330 may determine to preclude a corresponding node from the graph provided to that user.

Figure 4:
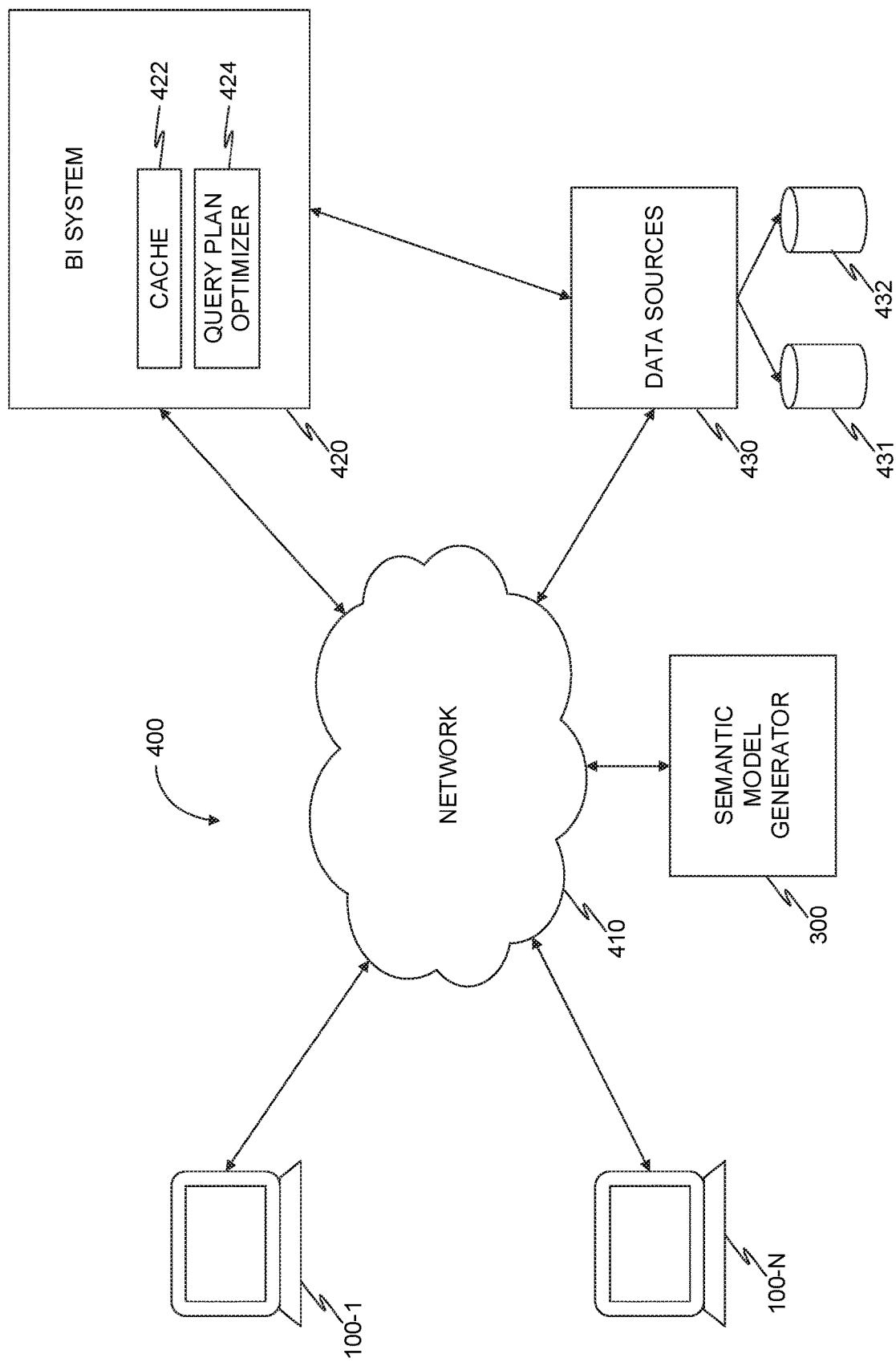
FIG. 4 is a network diagram utilized to describe various disclosed embodiments.

FIG. 4 is a network diagram 400 utilized to describe various disclosed embodiments. A plurality of user devices 100-1 through 100-N (where 'N' is an integer having a value of '2' or greater) are communicatively connected to a network 410.

The network 410 may be, but is not limited to, a wireless, cellular or wired network, a local area network (LAN), a wide area network (WAN), a metro area network (MAN), the Internet, the worldwide web (WWW), similar networks, and any combination thereof. The network 410 further provides communicative connectivity for the semantic model generator 300, for a business intelligence (BI) system 420, and one or more data sources 430.

In the example network diagram 400, the data sources 430 include a first database 431 and a second database 432. The BI system 420 is configured to generate a dashboard user interface (e.g., the user interface 110 displayed in FIG. 1). The BI system 420 may be communicatively connected to the data source 430 either directly or via the network 410. In an example implementation, the BI system 420 and the semantic model generator 300 may be part of the same local area network (LAN).

The BI system 420 is configured to supply the client devices 100 with a dashboard user interface (e.g., the dashboard 110, FIG. 1), and further to receive instructions (or requests) to execute queries with respect to the data sources 430. In some embodiments, the BI system 420 may allow the semantic model generator 300 to access an event log (e.g., the event log 310, FIG. 3) stored therein. In other embodiments, the event log may be stored on the semantic model generator 300. Such storage may be realized, for example, by configuring a client device (not shown) to send each instruction to both the semantic model generator 300 and the BI system 420. In an example implementation, a query result is not included in the event log 310 or provided to semantic model generator 300.

The BI system 420 further includes a query plan optimizer 424 and a cache 422. The query plan optimizer 424 receives a plurality of queries for execution on the data sources 430 and generates a query execution plan. The query execution plan includes a plurality of instructions which, when executed on the data sources 430, generate a plurality of results. Each result is associated with one or more instruction sets.

The cache 422 stores results from queries which are frequently required. In an embodiment, the semantic model generator 300 is configured to determine which queries should be precomputed and to cause the BI system 420 to store the results of the determined queries in the cache 422 before a user of a BI dashboard requests the results. By storing the result in the cache 422 prior to the actual request being received, a user may be supplied with the result faster, thereby decreasing idle time of the user and improving user experience by providing faster results.

It should be noted that the semantic model generator 300 is depicted in FIG. 4 as being separate from the BI system 420 (i.e., the system storing the cache 422), but that the disclosed embodiments are not limited as such. The semantic model generator 300 may be integrated within the BI system 420 or otherwise integrated with the storage in which the cache 422 is stored without departing from the scope of the disclosure.

Figure 5:
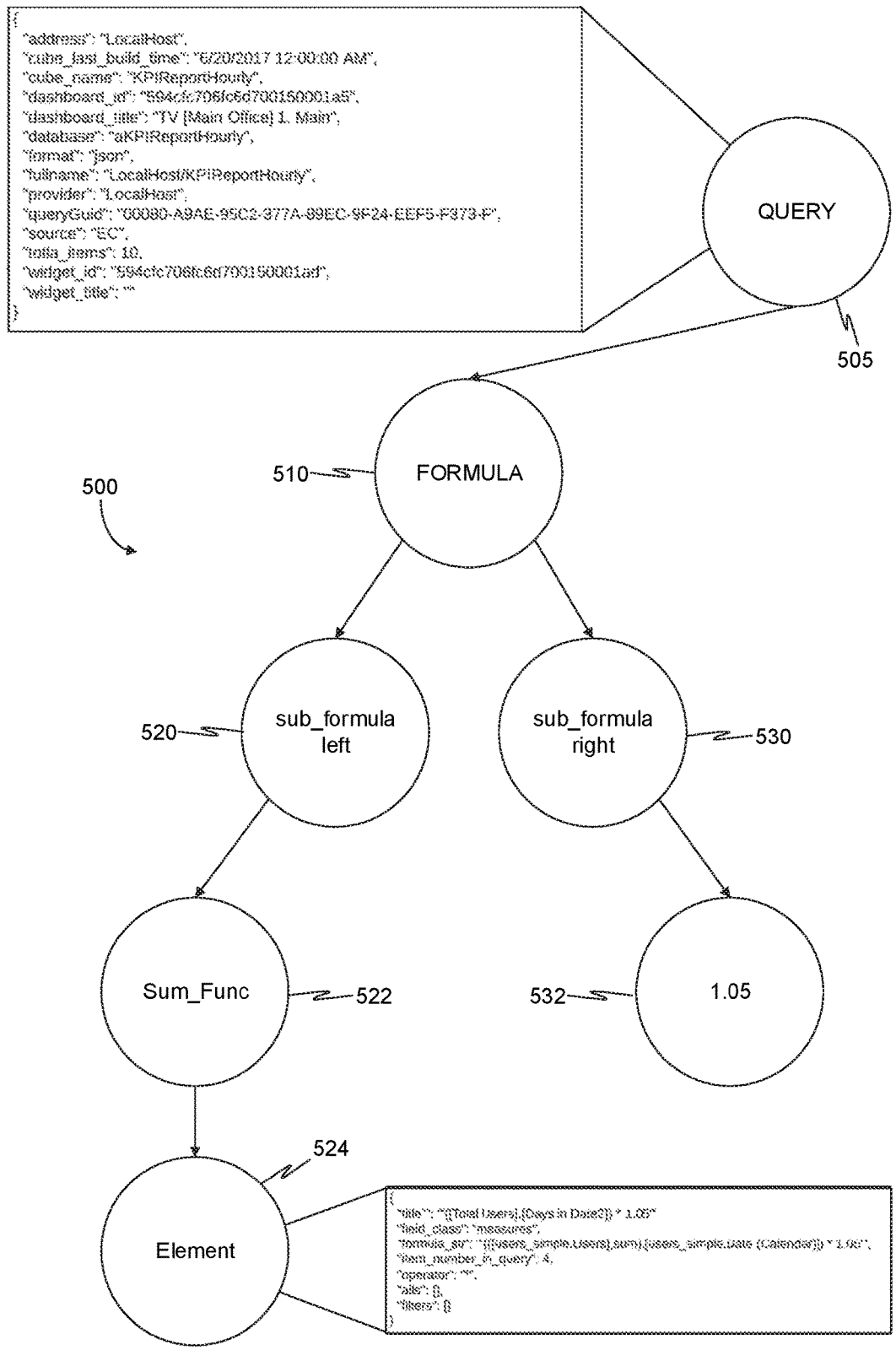
FIG. 5 is a flow diagram utilized to describe a query graph structure generated by a parser for a semantic knowledge graph generator.

FIG. 5 is an example flow diagram 500 utilized to describe a query graph structure generated by a parser for a semantic knowledge graph generator.

A formula 510 is identified from a query 505. The formula 510 includes a left sub-formula 520 and a right sub-formula 530. The left sub-formula 520 includes a SUM function 522, which itself includes a data element 524. The right sub-formula 530 includes a textual object 532. Each identified object shown in FIG. 5 has at least one relationship with another object.

In an embodiment, the query graph structure is provided as an input for the graph generator 330 of FIG. 3. The graph generator 330 may be configured to incorporate the information of the query graph structure into a larger graph stored therein. One method of incorporating may involve determining if an object of the query graph structure exists in the larger graph and, if not, adding the object to the larger graph. Additions can be based on a relationship to another object which is a part of the larger graph that also appears in the query graph structure.

Another method of incorporation may include determining that a first object and second object exist in both the query graph structure and the larger graph and determining the relationship between the first and second object. If a new relationship is found, the new relationship may be added to the larger graph. If an existing relationship is found, the weight of the relationship between the two objects may be increased. Updating the graph may include, but is not limited to, re-generating the query graph structure, using all previous inputs, or combining previous inputs with new inputs (i.e. new objects, new relations, and combinations thereof).

Figure 6:
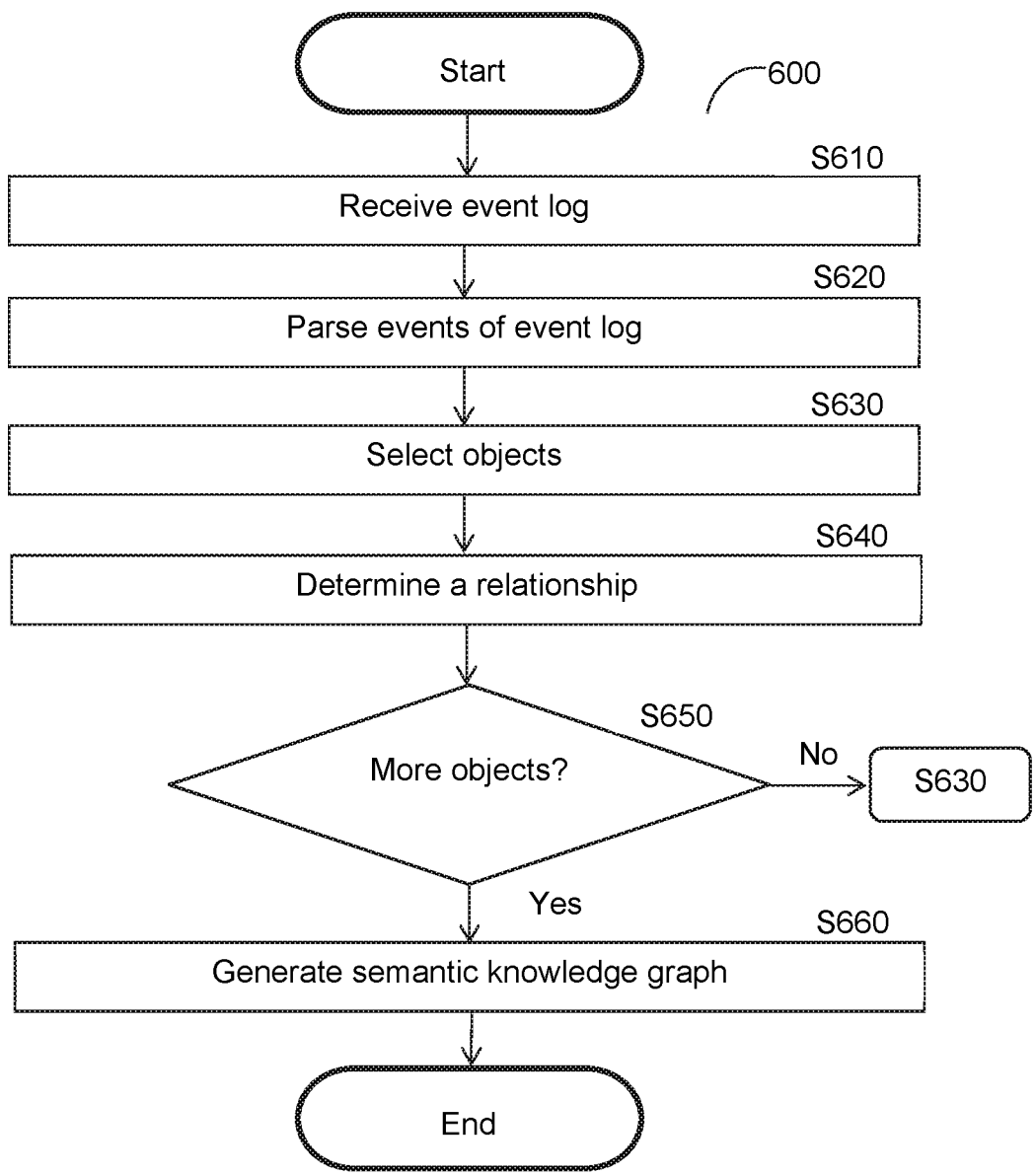
FIG. 6 is a flowchart illustrating a method for generating a semantic knowledge graph from an event log of a BI system according to an embodiment.

FIG. 6 is a flowchart 600 illustrating a method for generating a semantic knowledge graph from an event log of a BI system according to an embodiment. In an embodiment, the method is performed by the semantic model generator 300, FIG. 3.

At S610, an event log is received. The event log includes a plurality of events and may be continuously updated. In some embodiments, an initial event log is received, and thereafter events are received either as they occur, periodically, or both. For example, when there is a high volume of events, the events may be received periodically; and when there is a low volume of events, the events may be received as they occur. Events may be instructions related to loading a dashboard, loading a widget, executing one or more queries on one or more data sources, changing a filter on a query, changing a view of a widget, and the like.

At S620, each event of the received event log is parsed to identify objects and relations of those objects to one another. A parsed event may include, but is not limited to, a plurality of objects and relations thereof. In some embodiments, objects may be further associated with metadata of a columnar relational database. The metadata may be received from a BI system, or by requesting the metadata from the data sources.

At S630, objects are selected from among the identified objects in the parsed event(s). In some embodiments, multiple objects are received and every possible relationship between each pair of two objects from among the objects is determined. Each relationship may be further associated with a weight, which is increased based on a number of appearances in a parsed event.

At S640, a relationship is determined between at least a first object and a second object among the identified objects. In some embodiments, the first object, second object, or both, may each have relations to a plurality of other objects. In certain embodiments, the first object and second object may have a plurality of different relations to each other. For example, an object "SALARY_INCOME" may have both a "SUM" and an "AVG" (average) relationship to an object "INVESTMENT_INCOME," depending on the query being executed.

At S650, it is determined if additional objects should be added to the model and, if so, execution continues with S630; otherwise, execution continues with S660. The semantic model may be stored in a memory of a user device, at a network accessible storage device, and the like.

At S660, a semantic knowledge graph is generated (or updated, if one already exists) based on the determined relationships between objects. Generating the semantic knowledge graph may include determining a plurality of objects and the identified relations between them. In some embodiments, a semantic knowledge graph is generated by identifying a plurality of objects and generating all possible relations between them. Weights are added to the relations based on the determined relations from the parsed events.

In some embodiments, a graph may be generated based on a user account. In such embodiments, it may be further useful to determine a link between a user account and each event of the parsed event log, and to only input the parsed events which are linked to the user account into the semantic model.

In some embodiments, a general semantic model is generated for a group of users, which possibly have a dashboard or widget as a common feature. The general semantic model (also referred to as organizational memory model) may include identified objects and relations between the objects, each relationship further carrying a weight. A copy of the organizational memory model may then be associated with a user account and updated by only parsing events which pertain to the user account without changing the original organizational memory model.

The original organizational memory model may be continuously updated by inputting events from all users such that when a new user joins the organization (i.e., a group of users), the new user is presented with a seeded model, which may be customized to the user's needs over time based on use of the model by the user.

As a non-limiting example, two users are presented with a copy of a first organizational memory model. Each user, through use, causes the model to be adapted accordingly (i.e. causes changes to weights of object relationships) to their usage pattern. The first user causes addition of an object to their copy of the organizational model. The object added by the first user is not used by the second user, and is therefore not present in the second user's model. However, by continuously updating the first organizational memory model, the added object is present in the model when a third user joins the group, providing the third user with a more enriched model, and therefore more potential to gain insights from data. In some embodiments, individual user models may be updated based on a current version of the general organizational memory model.

In certain embodiments, a node, a relation, or both, may be culled from a semantic knowledge graph. Culling may be done based on, for example but not limited to, frequency of use, values of weights (e.g., relationships having weights below a threshold may be culled), vector distance (e.g., relationships having vector distances exceeding a threshold may be culled), combinations thereof, and the like. The culling may be performed, for example but not limited to, periodically.

In some embodiments, it may be advantageous to maintain snapshots of a semantic model to allow for reverting changes. Snapshots can be stored, for example, periodically. Multiple snapshots may be maintained, for example, for personalized models associated with different user accounts, for the original model, or both. Snapshots may also be stored in response to certain changes of the model. As a non-limiting example, adding or culling a node may trigger storing a snapshot; while changing a weight of a relation, adding a relation, or removing a relation, may not trigger such storage.

Figure 7:
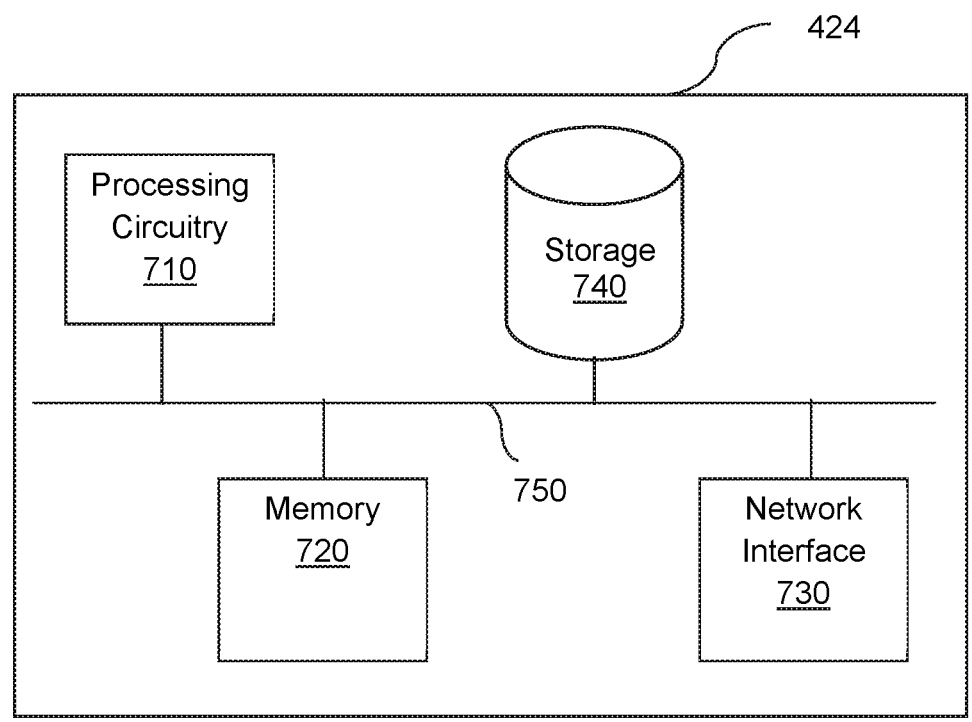
FIG. 7 is a schematic illustration of a semantic knowledge graph generator system according to an embodiment.

FIG. 7 is a schematic illustration 700 of the query execution plan optimizer 424 according to an embodiment.

The semantic model generator 300 includes a processing circuitry 710 coupled to a memory 720, a storage 730, and a network interface 740. In an embodiment, the components of the query execution plan optimizer 424 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the query execution plan optimizer 424 to communicate for purposes such as, but not limited to, receiving textual inputs, sending results of queries, and the like.

It should be understood that the embodiments described herein are not limited to the specific architecture illustrated in FIG. 7, and other architectures may be equally used without departing from the scope of the disclosed embodiments. For example, the components of FIG. 7 may also be configured to perform other BI system operations, semantic graph generation, or other functions which may be used by the disclosed embodiments.

Figure 8:
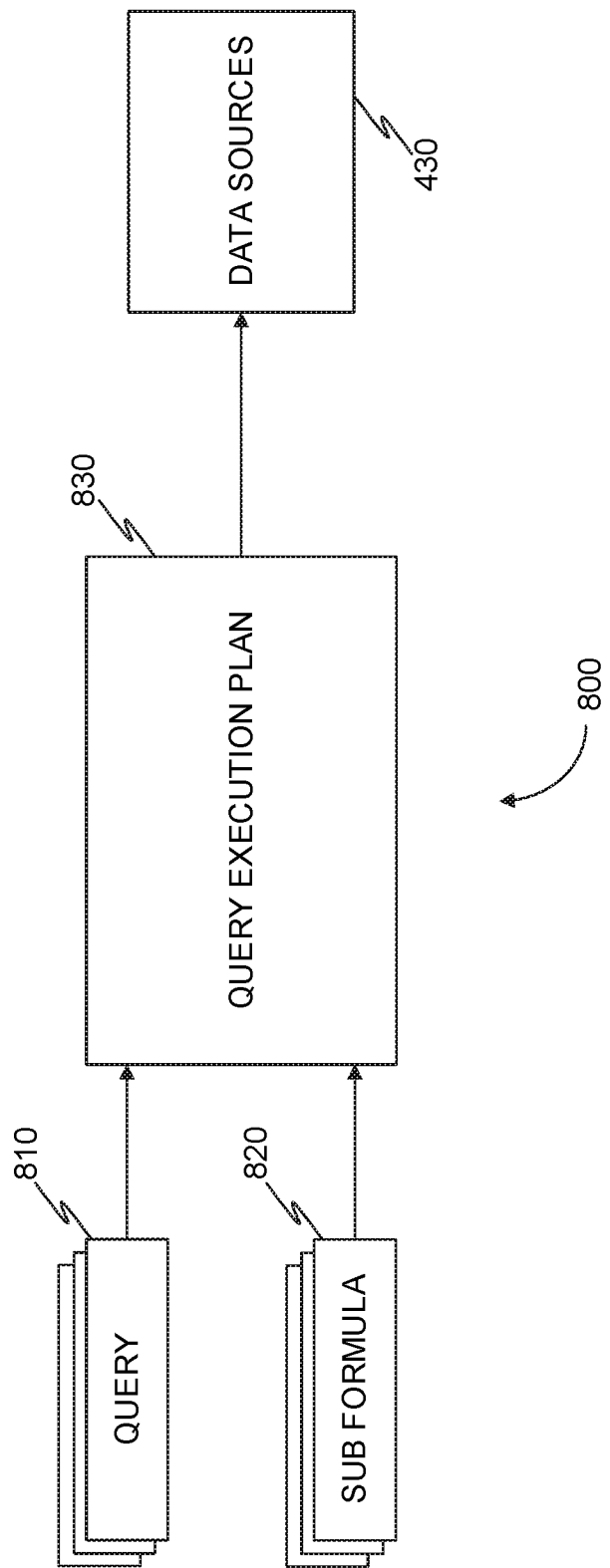
FIG. 8 is schematic illustration of a query execution plan updated by a semantic knowledge graph, implemented in accordance with an embodiment.

FIG. 8 is a schematic illustration 800 of a query execution plan updated by a semantic knowledge graph according to an embodiment.

A query execution plan 830 is created based on queries 810 and subformulas 820 which are executed on the data sources 430. It should be noted that this example discusses queries and subformulas, but it should be readily understood that any combination of queries, subformulas, or both may occur, and the disclosure is of course not limited to the present example.

The query execution plan 830 may be generated by the BI system 420 of FIG. 4 to optimize access to the data sources 430, since it would be inefficient to allow each query to execute on each data source as they are received. It would be beneficial for the BI system 420 to determine queries or parts thereof which are frequently used (e.g. accessed by a dashboard) and execute such determined queries prior to receiving a request from a user (e.g. by refreshing a dashboard) so as to improve user experience.

The disclosed embodiments allow for improving user experience by speeding up provision of results to a user of the BI dashboards. Executing partial or complete queries prior to receiving a request from a user allows for providing a result to the user faster than if the system waits for a user to actively make a request for the result. The knowledge graph generated by the semantic model generator 300 may be used for determining what queries and subformulas are frequently used, when they are used, and how to optimize a query execution plan based on the same.

Figure 9:
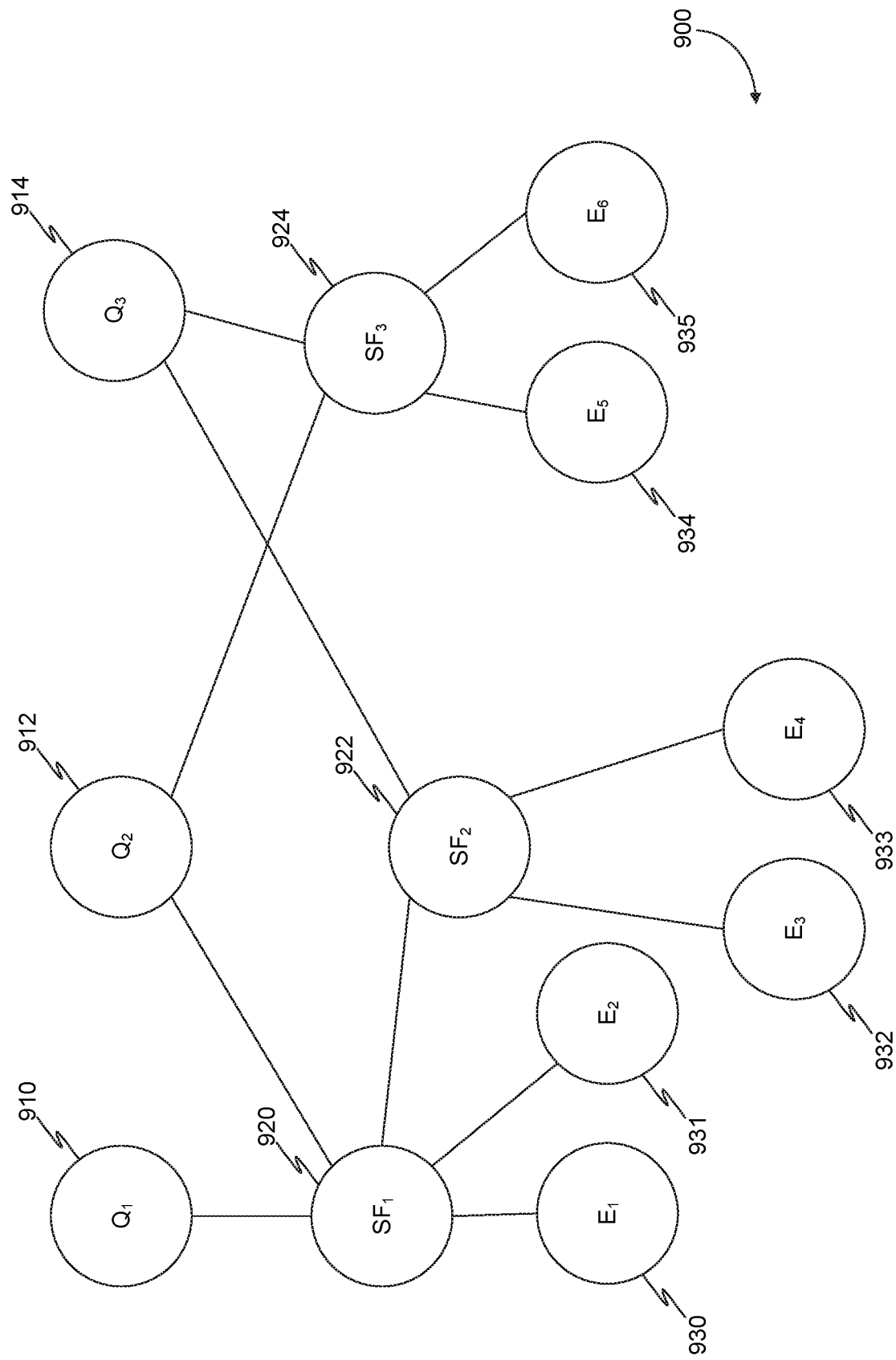
FIG. 9 is a semantic knowledge graph generated in accordance with the disclosed embodiments.

FIG. 9 is a schematic illustration of a semantic knowledge graph 900 generated in accordance with the disclosed embodiments. The example semantic knowledge graph 900 includes a plurality of query nodes 910, 912, and 914. In this example, each query node includes one or more subformula nodes 920, 922 and 924. A first query node 910 is connected with a first subformula node 920. A second query node 912 is connected with the first subformula node 920 and a third subformula node 924. A third query node 914 is connected with a second subformula node 922 and the third subformula node 924.

The first subformula node 920 is further connected with the second subformula node 922, a first query element node 930, and second query element node 931. The second subformula node 922 is connected with a third query element node 932 and a fourth query element node 933. The third subformula node 924 is connected with a fifth query element node 934 and a sixth query element node 935. Each query element node may represent a formula, a filter, a sub-formula, an argument, a measure, or a dimension.

Each node in the graph 900 may be connected to another node by one or more edges. Each edge may represent a different type of connection, which may indicate a relationship between the nodes. In an embodiment, each edge may be assigned a score or a weight. A score may be indicative of the strength of the relationship between two nodes. For example, a higher score indicates that the two nodes are more closely related (e.g. more likely to be executed together) than another pair of nodes. In an embodiment scores may be culled over time, so that one time variations (such as seasonal changes) do not affect the overall model in an unbiased manner.

In another example, a weight may be computed based on one or more scores associated with the edge of a particular node. In the example shown, the subformula represented by the second subformula node 922 is actually used for execution of each of the queries 910, 912, and 914. It would therefore be beneficial to precompute and cache the result of the second subformula node 922 so that when a user requests a result for any of the queries 912, 912 or 914, at least the portion which requires computation of the subformula of the second subformula node 922 would already be complete, thereby decreasing the load time to provide query results to the user. In an embodiment, precomputation may be dependent as a function of time. In the example shown in FIG. 9, it may further be beneficial to precompute and cache the results of each of the subformulas 920, 922 and 924, since they are each used to determine a result for one of the query nodes.

Figure 10:
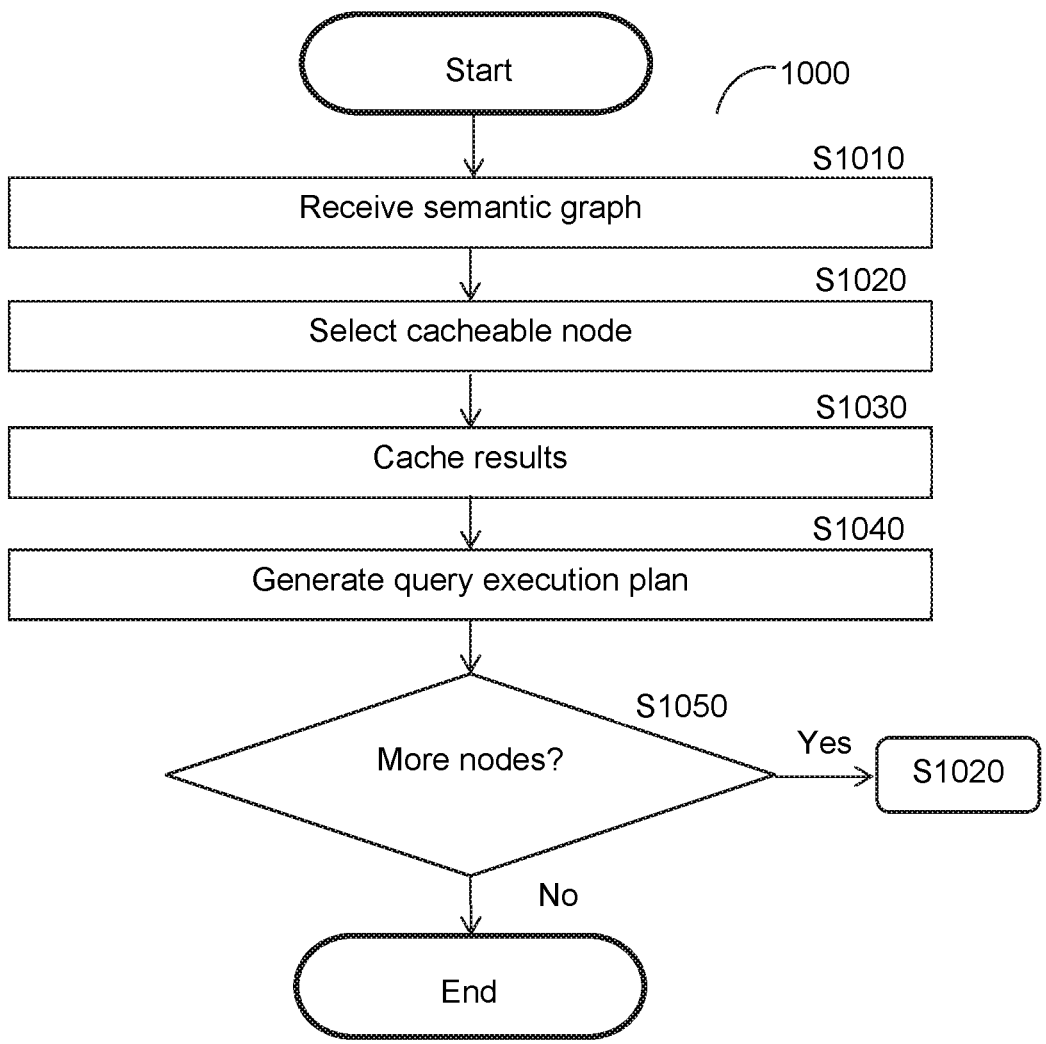
FIG. 10 is a flowchart illustrating a method for improving cache efficiency by updating a BI system cache for loading a dashboard based on a semantic knowledge graph according to an embodiment.

FIG. 10 is a flowchart 1000 illustrating a method for improving cache efficiency by updating a BI system cache for loading a dashboard based on a semantic knowledge graph according to an embodiment. In an embodiment, the method is performed by the query execution plan optimizer 424, FIG. 4.

At S1010, a semantic knowledge graph is received, for example, from the semantic graph generator 300. In an alternative embodiment, S1010 may include generating the semantic graph, for example as described above with respect to FIG. 6.

The semantic knowledge graph includes nodes and edges, where each edge represents a relationship between nodes. The nodes and edges of the semantic knowledge graph collectively define relationships between queries, query components (e.g., query elements, subformulas, both, and the like), and related query results. Thus, the semantic knowledge graph illustrates commonalities among queries and query components, thereby allowing for identification of queries and query components which are more likely to be executed in the future.

In an embodiment, the semantic knowledge graph further includes a connection score for each edge. The connection score for an edge indicates a strength of the relationship between nodes connected by the edge. The score may be a weight, for example as discussed in more detail with respect to FIG. 3 above.

At S1020, at least one cacheable query node is selected.

In an embodiment, each cacheable query node is selected by detecting a query node having a relevance score or weight above a threshold. In an embodiment, the relevance score of a node may be computed based on connection scores of edges, where the connection score of each edge indicates a strength of a relationship between nodes represented by the edge. In a further embodiment, the relevance score may be determined based on an average of connection scores of edges connecting the node, a number of edges connecting the node, both, and the like.

In another embodiment, the first query node may be selected by determining edge ranking between a plurality of query nodes, such that a query node with the highest edge ranking is selected before a query node with the second highest edge ranking, and the like. In other words, the query nodes are ranked from most to least relevant by their respective edge ranks. The edge ranking of each node may be determined based on the connection scores of the edges connecting the node. In an example implementation, the edge ranking is based on the connection scores such that the node connected by an edge having the highest connection score is the highest ranked node, the node connected by an edge having the second highest connection score is the second highest ranked node, and the like.

Because the relevance scores are determined based on strengths of relationships between nodes, higher relevance scores tend to indicate that the node is frequently used such that precomputing and caching high relevance nodes (e.g., nodes having relevance scores above a threshold) will decrease the time a user spends waiting for queries to be returned while using the BI system.

At S1030, results of executing a query based on the query component represented by the selected cacheable query nodes are stored in a cache. In an embodiment, S1030 includes executing one or more queries based on the cacheable query nodes. As a non-limiting example, a first query is executed. The first query corresponds to a first query node, which in turn is connected to various query component nodes. A first query component node connected to the first query node is connected to a second query node or to a second query component node, which in turn is connected to the second query node. Thus, the graph may be traversed to find another (i.e. second) query node which is connected to the first query node such that the connection scored exceeds a threshold. Executing a query associated with the second query node prior to the user requesting such execution would decrease the time a user waits between requesting a result and receiving the result. This improves the user experience with the BI system.

At S1040, a query execution plan is generated based on the selected cacheable node. A new query execution plan may be generated, or an existing query execution plan may be updated to include a portion of the plan for using cached contents. The generated query execution plan includes one or more instructions for executing queries using the cached results when appropriate, for example, when a received query includes one or more query components that match the cacheable query nodes.

In an embodiment, the query execution plan may be updated periodically to include or remove results corresponding to one or more nodes of the semantic knowledge graph. In a further embodiment, results corresponding to certain nodes may be culled periodically, to refresh the cache and as a mechanism to ensure that the cache is populated with results which are likely to decrease idle time for the user of the BI dashboard.

It should be readily understood that the method may be utilized in full or in part. For example, the method may be used to determine what queries should be awaiting in cache before a dashboard is requested, which queries correspond to widgets which are frequently viewed first, and the like. For example, the dashboard may include a plurality of widgets which do not all fit on a single screen, requiring the user to scroll up or down to view the entire dashboard. If a certain widget is not immediately visible and requires scrolling down, but is often the first widget a user interacts with, that results of query nodes used by that widget may be loaded prior to loading others (i.e., executing the queries whose results are used to populate the widget user interface). By loading results that are more likely relevant based on whether a portion of a dashboard is currently being viewed, query times may be further improved as compared to, approaches which load widgets according to their place in the dashboard (e.g., depending on a predetermined order of widgets horizontally, vertically, etc.).

At optional S1050, it is checked if additional cacheable nodes should be identified. If so, execution continues with S1020; otherwise execution terminates. In some embodiments, cacheable query nodes may be selected until a predetermined number of cacheable query nodes have been selected, until a predetermined amount or proportion of a cache is full, until the cache does not have room for the next highest scoring or ranking query node, and the like.

Figure 11:
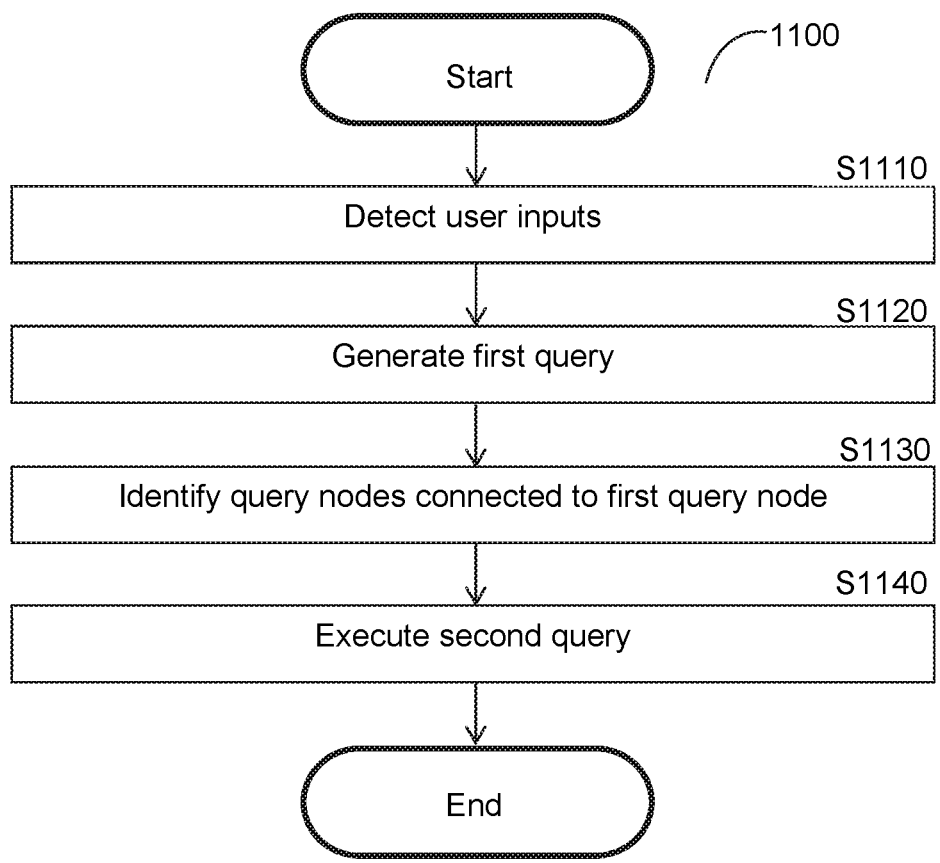
FIG. 11 is a flowchart illustrating a method for real time updating of a BI system cache based on a semantic knowledge graph, implemented in accordance with an embodiment.

FIG. 11 is a flowchart 1100 illustrating a method for real-time updating of a BI system cache based on a semantic knowledge graph according to an embodiment.

At S1110, one or more user inputs are detected. The user inputs are captured responsive to interactions with a computer generated user interface of a BI dashboard. As a non-limiting example, a user input may be activating a filter on a particular widget.

At S1120, a first query is generated based on the user input. The query includes one or more query components (e.g., query elements, subformulas, both, and the like) that are represented as various nodes and edges in a semantic knowledge graph as explained in more detail above.

At S1130, one or more query nodes are identified from the semantic knowledge graph such that the identified query nodes collectively represent a second query which has a non-zero probability to be requested by the user following the request for executing the first query.

In an embodiment, the identified query nodes of the second query are query nodes which are connected to query nodes of the first query either directly through edges or indirectly (e.g., by traversing a path including one or more other nodes and two or more edges). In an optional embodiment, when the connection is indirect, a path can only be traversed when the path includes traversing at most a predetermined number of nodes.

In an embodiment, the identified query nodes also demonstrate some strength of connection to the query nodes of the first query. To this end, S1130 may include determining whether each other query node in the semantic knowledge graph is connected to the first query and determining a probability that the second query corresponds to the first query node. In an embodiment, the probability is determined based on connection scores of edges directly or indirectly connecting the query nodes of the first query to other query nodes of the semantic knowledge graph. More specifically, the query nodes may be identified using relevance weights with respect to the first query node or edge-based ranking as described further above with respect to FIG. 10.

As a non-limiting example, there may be a non-zero probability that after applying a 'by day' filter to a widget on a dashboard, a user will apply a 'by week' filter. Each filter represents a different query which should be executed, the results of which are used in the BI dashboard to update the widget.

At S1140, one or more second queries is executed based on the identified query nodes. In an embodiment, when the second query has been executed, execution may continue at S1110. In another embodiment, execution may continue at S1130 when the second query has been executed.

In an embodiment, the second query is only executed if the probability associated with one or more of the identified query nodes is above a threshold. In some embodiments, multiple second queries may be executed by the system. This may occur, for example, when multiple second query nodes each have a probability exceeding the threshold, or when one or more second queries each have an equal probability which exceeds the threshold.

In some embodiments, the second queries may be executed without determining a probability threshold. In such embodiments, second queries may be executed until a predefined system resource is determined to be at capacity. For example, a certain amount of storage may be dedicated to caching predicted requested results (i.e. the results of the second queries) and the system repeatedly determines the next predicted query until the allocated storage space is full. In these embodiments, an eviction policy may be in effect to determine when query results are not likely to be requested by the user and may therefore be evicted from the cache.

As the term dashboard is used throughout this disclosure, it is intended to convey a visual rendering of one or more widgets, and should not be viewed as limiting to any particular dashboard. A dashboard may include, but is not limited to, instructions for rendering one or more widgets, each based on one or more queries, and an order in which the widgets should be rendered.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improving cache efficiency, comprising:
   selecting at least one cacheable query node of a plurality of query nodes from a semantic knowledge graph, the selecting being based on a cachability relevance score of the at least one cacheable query node;
   storing a result of executing a query generated based on the at least one cacheable query node in a cache; and
   generating a query execution plan based on the at least one cacheable query node, wherein the generated query execution plan includes at least one instruction for query execution using the stored result, wherein the semantic knowledge graph is generated by:
   receiving a plurality of events, wherein the plurality of events includes a plurality of queries, wherein each event of the plurality of events is related to an interaction with at least one data source;
   parsing each event of the plurality of received events into a plurality of objects;
   determining for each of the plurality of events, a relationship between two objects of the plurality of objects;
   generating the semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a strength of relationship between the two nodes connected by the edge;

repeating the receiving, parsing, determining, and generating so as to cause the semantic knowledge graph to be updated continually over time as events occur; and assigning a score to each edge, wherein the score assigned to each edge indicates a weight of the edge, wherein the score assigned to each edge is determined based on a number of appearances of the relationship represented by the edge in the parsed plurality of events.

2. The method of claim 1, wherein selecting the at least one cacheable query node further comprises:
determining the cachability relevance score of each of the plurality of query nodes based on the connecting score of each edge connecting the query node to other query nodes of the plurality of query nodes.

3. The method of claim 1, wherein selecting the at least one cacheable query node further comprises:
determining the cachability relevance score of each of the plurality of query nodes based on an edge rank for each of the plurality of query nodes, the edge rank being based on the connecting score of each edge connecting the query node to other query nodes of the plurality of query nodes, wherein the edge ranks determined for the at least one cacheable query node are the highest edge ranks among the plurality of query nodes, wherein the plurality of query nodes are ranked from most to least relevant by their respective edge ranks.

4. The method of claim 1, further comprising:
providing the stored result to a widget of a dashboard user interface.

5. The method of claim 4, further comprising:
receiving a user input based on interaction with the dashboard user interface, wherein the user input causes a first user query to be generated; and
determining a second user query based on the second query and the semantic knowledge graph, wherein the second user query is a predicted next query of a user of the dashboard user interface.

6. The method of claim 5, wherein determining the second user query further comprises:
identifying at least one query node of the plurality of query nodes in the semantic knowledge graph such that the identified at least one query node collectively represents the second user query, wherein the first user query includes at least one query component, each query component of the first user query corresponding to one of the plurality of query nodes of the semantic knowledge graph, wherein the second user query is determined based further on the identified at least one query node;
executing the second user query, wherein executing the second user query includes generating the second user query based on the identified at least one query node;
storing a result of executing the second user query in the cache.

7. The method of claim 6, wherein each of the identified at least one query node is directly connected, by an edge, to one of the plurality of query nodes which corresponds to one of the at least one query component of the first user query.

8. The method of claim 6, wherein each of the identified at least one query node is indirectly connected to one of the plurality of query nodes which corresponds to one of the at least one query component of the first user query such that a path can be traversed in the semantic knowledge graph between each identified query node and one of the plurality of query nodes corresponding to a query component of the first user query.

9. The method of claim 8, wherein the path includes traversing at most a predetermined number of query nodes of the plurality of query nodes.

10. The method of claim 1, further comprising:
evicting the result of executing the query based on the at least one cacheable query from the cache, wherein the result is evicted based on a cache eviction policy.

11. A non-transitory computer readable medium having stored thereon instructions for causing a processing circuitry to execute a process, the process comprising:
selecting at least one cacheable query node of a plurality of query nodes from a semantic knowledge graph, the selecting being based on a cachability relevance score of the at least one cacheable query node;
storing a result of executing a query generated based on the at least one cacheable query node in a cache; and
generating a query execution plan based on the at least one cacheable query node, wherein the generated query execution plan includes at least one instruction for query execution using the stored result, wherein the semantic knowledge graph is generated by:
receiving a plurality of events, wherein the plurality of events includes a plurality of queries, wherein each event of the plurality of events is related to an interaction with at least one data source;
parsing each event of the plurality of received events into a plurality of objects;
determining for each of the plurality of events, a relationship between two objects of the plurality of objects;
generating the semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a strength of relationship between the two nodes connected by the edge;
repeating the receiving, parsing, determining, and generating so as to cause the semantic knowledge graph to be updated continually over time as events occur; and
assigning a score to each edge, wherein the score assigned to each edge indicates a weight of the edge, wherein the score assigned to each edge is determined based on a number of appearances of the relationship represented by the edge in the parsed plurality of events.

12. A system for improving cache efficiency, comprising:
a processing circuitry; and
a memory, the memory containing instructions that, when executed by the processing circuitry, configure the system to:
select at least one cacheable query node of a plurality of query nodes from a semantic knowledge graph, the selecting being based on a cachability relevance score of the at least one cacheable query node;
store a result of executing a query generated based on the at least one cacheable query node in a cache; and generate a query execution plan based on the at least one cacheable query node, wherein the generated query execution plan includes at least one instruction for query execution using the stored result, wherein the semantic knowledge graph is generated by further configuring the system to:
  receive a plurality of events, wherein the plurality of events includes a plurality of queries, wherein each event of the plurality of events is related to an interaction with at least one data source;
  parse each event of the plurality of received events into a plurality of objects;
  determine for each of the plurality of events, a relationship between two objects of the plurality of objects;
  generate the semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a strength of relationship between the two nodes connected by the edge;
  repeat the receiving, parsing, determining, and generating so as to cause the semantic knowledge graph to be updated continually over time as events occur; and
  assign a score to each edge, wherein the score assigned to each edge indicates a weight of the edge, wherein the score assigned to each edge is determined based on a number of appearances of the relationship represented by the edge in the parsed plurality of events.

13. The system of claim 12, wherein the system is further configured to:
  determine the cachability relevance score of each of the plurality of query nodes based on the connecting score of each edge connecting the query node to other query nodes of the plurality of query nodes.

14. The system of claim 12, wherein the system is further configured to:
  determine the cachability relevance score of each of the plurality of query nodes based on an edge rank for each of the plurality of query nodes, the edge rank being based on the connecting score of each edge connecting the query node to other query nodes of the plurality of query nodes, wherein the edge ranks determined for the at least one cacheable query node are the highest edge ranks among the plurality of query nodes, wherein the plurality of query nodes are ranked from most to least relevant by their respective edge ranks.

15. The system of claim 12, wherein the system is further configured to:
  provide the stored result to a widget of a dashboard user interface.

16. The system of claim 15, wherein the system is further configured to:
  receive a user input based on interaction with the dashboard user interface, wherein the user input causes a first user query to be generated; and
  determine a second user query based on the second query and the semantic knowledge graph, wherein the second user query is a predicted next query of a user of the dashboard user interface.

17. The system of claim 16, wherein the system is further configured to:
  identify at least one query node of the plurality of query nodes in the semantic knowledge graph such that the identified at least one query node collectively represents the second user query, wherein the first user query includes at least one query component, each query component of the first user query corresponding to one of the plurality of query nodes of the semantic knowledge graph, wherein the second user query is determined based further on the identified at least one query node;
  execute the second user query, wherein executing the second user query includes generating the second user query based on the identified at least one query node;
  store a result of executing the second user query in the cache.

18. The system of claim 17, wherein each of the identified at least one query node is directly connected, by an edge, to one of the plurality of query nodes which corresponds to one of the at least one query component of the first user query.

19. The system of claim 17, wherein each of the identified at least one query node is indirectly connected to one of the plurality of query nodes which corresponds to one of the at least one query component of the first user query such that a path can be traversed in the semantic knowledge graph between each identified query node and one of the plurality of query nodes corresponding to a query component of the first user query.

20. The system of claim 19, wherein the path includes traversing at most a predetermined number of query nodes of the plurality of query nodes.

21. The system of claim 12, wherein the system is further configured to:
  evict the result of executing the query based on the at least one cacheable query from the cache, wherein the result is evicted based on a cache eviction policy.

* * * * *